R. J. SOUTULLO.

BOTTLE REFRIGERATOR.

APPLICATION FILED MAY 13, 1922.

Reissued Oct. 31, 1922. 15,482.

Inventor

Raymond J. Soitullo

By T. W. Wilkinson

Attorney

Reissued Oct. 31, 1922. Re. 15,482

UNITED STATES PATENT OFFICE.

RAYMOND JOHN SOUTULLO, OF MOBILE, ALABAMA, ASSIGNOR, BY MESNE ASSIGNMENTS, TO K. C. WINTER, GORDON SMITH, W. D. BELLINGRATH, AND E. C. GRACE, ALL OF MOBILE, ALABAMA.

BOTTLE REFRIGERATOR.

Original No. 1,390,934, dated September 13, 1921, Serial No. 378,324, filed May 1, 1920. Application for reissue filed May 13, 1922. Serial No. 560,769.

*To all whom it may concern:*

Be it known that I, RAYMOND JOHN SOUTULLO, a citizen of the United States, residing at Mobile, county of Mobile, Alabama, have invented certain new and useful Improvements in Bottle Refrigerators, of which the following is a specification.

This invention relates to an improved bottle container and refrigerator adapted for use in stores or homes to receive in a novel way, bottles containing milk, soft drinks and the like, so that the same will be retained in a cool and sanitary condition with a minimum expenditure of ice and in such a manner as to greatly facilitate the dispensing of the bottles containing the colder beverages, in addition to keeping the different flavors such as of soda water or other carbonated beverages or the like, separated, and thus obviating the necessity of leaning over; fumbling over the bottles and losing considerable time in the dispensing operation.

A further object of the invention is to construct a bottle container and dispenser which is combined with a refrigerator for receiving food stuff whereby both may be kept cool and fresh with the same refrigerating medium.

A further object of the invention is to provide improved means for receiving the bottles and necessitating the insertion of a new one in order to remove a cold bottle, and means for removing all of the bottles and any broken glass in case one of the bottles should break, due to sudden contraction, said means also serving to prevent wear on the tubes or U-shaped compartments which are designed to receive the bottles in the use of the invention.

Other and further objects of my invention will become readily apparent from a consideration of the following description, when taken in conjunction with the accompanying drawings, wherein.

Figure 1:
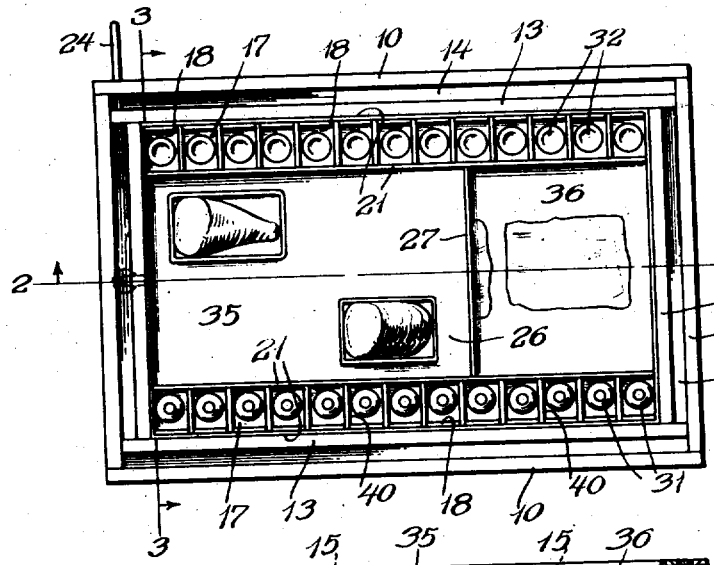
Figure 1 is a plan view of my improved bottle container and refrigerator.

Referring to the drawings in detail there is shown an ice box or chest forming the receptacle proper or housing consisting of spaced walls 10 and 13 having the outer wall 10 supported if desired on legs 11 so that the bottom 12 will be disposed at a spaced distance from the floor. Within the outer wall 10 is the inner wall 13 forming an air space 14 between said walls to exclude heat and retain the box at a low temperature within, it being understood that the box is provided or may be provided with a cover of the usual or any preferred type. That is, the compartments 35 and 36 within the inner wall may be provided with a pair of removable covers 15 and with a surrounding wall or cover 16 formed of side and end pieces.

Arranged along opposite sides of the inner wall 13, preferably at the front and back, are a series of tubes or channels 17 preferably of U-shaped formation and of metal so as to slidably receive therein flexible bottom strips 18, either end of which is adapted to be bent in the form of a hook 19 so that should any of the bottles 20 disposed on end therein be broken due to sudden contraction, they may be removed by removing the removable bottom or strip 18, the bent portion or hook 19 serving to engage and remove the broken glass. It will also be understood that the different flavors may be arranged in the different channels or different beverages may be kept therein in any suitable containers but that new or warm bottles must be inserted and pressed into position in order to remove the cold bottles, so that the tubes or channels will always be filled. These tubes may be of circular, rectangular, or other cross section.

Figure 2:
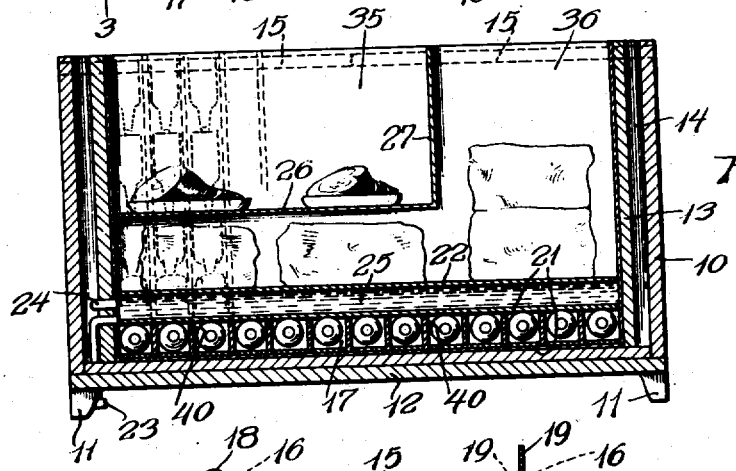
Figure 2 is a vertical longitudinal sectional view, taken on the line 2—2 of Figure 1.
Figure 3:
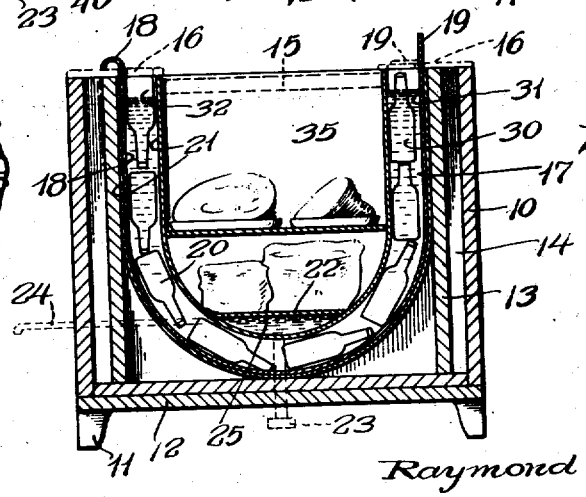
Figure 3 is a vertical transverse sectional view, taken on the line 3—3 of Figure 1.

Disposed within the inner wall 13 of the refrigerator is a hollow shell 21 containing a refrigerating fluid 31, and forming the inner and outer walls of the tubes or channels 17, while the partition strips 40, Figures 1 and 2, form the side walls thereof. And disposed within the inner wall of this hollow shell 21 is a space divided by the partitions 26 and 27 into a provision compartment 35 and an ice compartment 36. As shown, a supporting tray 22 for the ice is also provided near the bottom of this compartment space, and it forms a water compartment 25 for the reception of the drip. A valved drain 23, and an overflow pipe 24 is provided for the compartment 25. It thus results that the ice in the compartment 36 the drip water in the compartment 25 and the refrigerating liquid in the hollow shell 21 each serve to cool the provisions in the compartment 35 and the bottles in the channels 17. The compartment 36 extends underneath the compartment 35 as shown so that a maximum storage space as well as a maximum cooling efficiency is secured.

Figure 4:
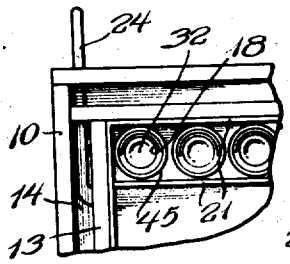
Figure 4 is a plan view of a modification.

Ordinarily breakage of the bottles will not occur, but might happen by reason of some inherent defect in the bottles though this breakage may be lessened by submerging or partially floating the bottles in water, or like cooling liquid disposed in the tubes or channels 17, or around the tubes 45, in the form of the invention shown in Figure 4 of the drawings. That is to say, this cooling fluid will cause the bottles or containers, and their contents to be buoyed up; and it will lessen the friction and render it easier to put in warm bottles in order to remove the cold ones, thus facilitating the charging and discharging of the tubes or channels 17.

It will now be clear that the channels or tubes of the hollow shell 21 when supplied with a refrigerating liquid 31 will enable the dispenser to successively place bottles neck down into one end of a tube or channel 17, with the mouth end of a succeeding bottle pushing the bottom end of a preceding bottle, until each channel or tube is filled with bottles surrounded by the liquid 31. It will also be apparent that the first bottle 30 of the curved row of bottles thus formed will be placed in an upright position, so its neck can be readily grasped by the dispenser's hand, and that the last bottle 32 of said curved row of bottles also stands with its axis vertical but with its bottom uppermost.

In other words, it is apparent that the dispenser when he desires a cold bottle may face the side of the refrigerator box, and with one hand force a warm bottle neck down into one end of a tube or channel 17; and owing to the bottles in said tube being buoyed up or floated by the cooling fluid 31, he will readily and with a minimum of friction force upwardly the first and coldest bottle, 30, of the curved row of bottles, which can be grasped by the neck with his other hand and withdrawn.

It will also be clear that the chamber 36 and the ice therein constitutes a refrigerating means for the entire apparatus, while one or more of the U-shaped channels or tubes 17 and the refrigerating liquid 31 therein constitutes means to further cool and buoy up curved rows of bottles placed end to end in said channels. It will further be clear that the employment in a cold liquid of a curved row of bottles so disposed that the mouth portion of a succeeding bottle presses against the bottom of a preceding bottle, insures that the dispenser will always get the coldest bottle he has on hand, and as it insures the placing of a warm bottle in the curved channel to take the place of the one removed, the dispenser will not forget to keep a supply of cold bottles for future customers. It therefore results that this relation of parts constitutes a combined bottle refrigerating and dispensing means.

In view of the foregoing, it is thought that the operation of the device will be readily understood, and in view of the simplicity and practical value that it will readily commend itself to those skilled in the art.

I claim:

1. A combined bottle container and refrigerator comprising a receptacle proper having a shell therein, of substantially U-shaped cross section and forming an inner provision chamber and ice compartment, said shell having a series of upright U-shaped channels disposed side by side.

2. A combined bottle container and refrigerator comprising a receptacle proper having a shell therein, of substantially U-shaped cross section and forming an inner provision chamber and ice compartment, said shell having a series of upright U-shaped tubes adapted to contain and retain a refrigerating fluid therein and receive the bottles therein end to end and closures for the upper ends of the tubes.

3. A bottle refrigerator comprising a receptacle provided with a refrigerating compartment, a series of U-shaped tubes within said receptacle and adapted to receive and dispense separate series of bottles end to end in counterbalancing relation.

4. A refrigerator for bottled beverages or the like comprising a receptacle provided with refrigerating means, a series of U-shaped tubes within said receptacle and adapted to receive separate series of bottles therein end to end in counterbalancing relation, and removable bottom liner portions for said tubes adapted to engage and remove the contents of the tubes when removed therefrom.

5. A refrigerator comprising a receptacle having spaced walls suitably supported, a U-shaped shell within the walls and forming an inner compartment, said shell being divided into a series of channels, a drain tray supported within the inner compartment and adapted to support ice thereon, a drain for said compartment, a partition within the compartment above the drain tray and having a vertical portion dividing the same from the ice chamber, and closures for said compartments.

6. A refrigerator of the class described having a U-shaped water tight casing open at its top and horizontally positioned therein with its leg portions turned upwardly, and said casing provided with a plurality of partitions forming U-shaped passages with vertically disposed leg portions adapted to receive bottles placed end to end, substantially as described.

7. In a bottle refrigerator, the combination of a housing receptacle; a U-shaped channel in said receptacle having vertically disposed leg portions forming inlet and outlet openings for the bottles and adapted to contain a heat conducting fluid capable through its buoyancy of facilitating the discharge of said bottles; and means for holding a refrigerant in heat interchanging relation to said channel.

8. A refrigerating container for bottled goods and the like, comprising a receptacle having substantially U-shaped channels open at their upper ends and curved bight portions, and means for removing the contents of the channels, said means being withdrawable through the channels.

9. A refrigerator for bottles and beverages or the like comprising a receptacle provided with means for holding a refrigerant, and an upright U-shaped shell having tubes adapted to receive the bottles therein end to end and whereby one bottle will be forced out or projected from one end for removal upon the application of an additional one at the opposite end.

10. A refrigerator comprising a receptacle having spaced walls suitably supported, a U-shaped shell within the walls and forming an inner compartment, said shell being divided into a series of channels disposed side by side and closures for said compartment and the top of the refrigerator, said closures having openings above the ends of the channels.

11. In a bottle refrigerator, the combination of a U-shaped means having vertically positioned open ended leg portions adapted to receive and hold a buoyant liquid and a plurality of bottles disposed in a curved row, and means for holding a refrigerant located between said vertically positioned leg portions, substantially as described.

12. In a bottle refrigerator, the combination of means to hold a curved row of bottles placed end to end comprising an upright and substantially U-shaped open ended channel adapted to hold said bottles as well as a heat conducting liquid in each of its legs; and means for holding a refrigerant located between said legs, substantially as described.

13. In a bottle refrigerator, the combination of a refrigerating chamber adapted to contain refrigerating means; and a plurality of curved substantially U-shaped means located outside said chamber having vertically positioned leg portions adapted to receive a liquid as well as a plurality of bottles of different kinds of beverages disposed in curved rows, substantially as described.

14. A bottle refrigerator comprising a compartment for the refrigerating medium and an upright bottle receiving channel substantially U-shaped in form with vertically positioned leg portions and whose body portion is adapted to normally contain a heat conducting fluid and a plurality of bottles buoyed up by said fluid, and said compartment being located in a heat interchanging relation with the walls of said channel, substantially as described.

15. In a bottle refrigerator the combination of a refrigerating chamber and a substantially U-shaped channel member located outside said chamber having vertically positioned leg members each of which is normally adapted to receive a vertically disposed bottle as well as a heat extracting liquid capable of buoying up said bottles, substantially as described.

16. In a bottle refrigerator the combination of a refrigerating chamber and a U-shaped means adapted to receive a curved row of bottles and also a fluid to buoy up said bottles, said U-shaped means being disposed on two vertical sides and across said chamber, substantially as described.

17. A bottle cooler comprising a curved substantially U-shaped means provided with a pair of vertically disposed leg portions adapted to hold a plurality of bottles disposed end to end, and containing a quantity of liquid sufficient to lessen the friction of said bottles when pushed therethrough, substantially as described.

18. A bottle cooler comprising a substantially U-shaped open ended bottle holder provided with vertically disposed leg portions adapted to contain bottles disposed end to end and associated with a quantity of liquid sufficient to buoy up said bottles and lessen the friction engendered by the same when pushed through said holder, substantially as described.

In testimony whereof, I have hereunto set my hand, at Mobile, State of Alabama this 9th day of May, 1922.

RAYMOND JOHN SOUTULLO.